United States Patent [19]
Davis et al.

[11] 3,960,822
[45] June 1, 1976

[54] CROSSLINKING POLYMERS WITH CHLORONITROSO COMPOUNDS

[75] Inventors: Pauls Davis, Gibraltar; Herwart C Vogt, Grosse Ile; Charles F. Deck, Trenton, all of Mich.

[73] Assignee: BASF Wyandotte Corporation, Wyandotte, Mich.

[22] Filed: Oct. 10, 1974

[21] Appl. No.: 513,647

[52] U.S. Cl. ............... 260/79.5 P; 260/96 HA; 260/772; 526/12; 526/13; 526/14; 526/17; 526/19; 526/30; 526/42; 526/49; 526/242; 526/291; 526/295; 526/340; 526/347; 526/345; 526/350; 526/351; 526/352

[51] Int. Cl.$^2$ ................ C08C 19/12; C08C 19/32; C08F 28/00

[58] Field of Search ............... 260/79.5 P, 94.9 H, 260/94.9 GB, 96 HA, 80.3 R, 80.73, 772

[56] References Cited
UNITED STATES PATENTS

| | | | |
|---|---|---|---|
| 2,964,517 | 12/1960 | Eck et al. | 260/96 HA |
| 3,345,315 | 10/1967 | Barton et al. | 260/94.9 H |
| 3,553,176 | 1/1971 | Fujisaki et al. | 260/79.5 P |
| 3,671,511 | 6/1972 | Honnen et al. | 260/94.9 GB |
| 3,723,404 | 3/1973 | Davis et al. | 260/94.9 GB |
| 3,763,134 | 10/1973 | Davis et al. | 260/82.1 |

*Primary Examiner*—Ronald W. Griffin
*Attorney, Agent, or Firm*—Norbert M. Lisicki; Bernhard R. Swick; Robert E. Dunn

[57] ABSTRACT

Organic polymers are crosslinked with polyfunctional chloronitroso containing compounds.

6 Claims, No Drawings

CROSSLINKING POLYMERS WITH CHLORONITROSO COMPOUNDS

BACKGROUND OF THE INVENTION

1. Field of the Invention

This invention relates to a process of crosslinking organic polymers. More specifically, this invention relates to a process of crosslinking polymers by using polyfunctional chloronitroso hydrocarbon compounds and to the crosslinked polymers thereof.

2. Prior Art

Known crosslinking systems for polymers generally have such undesirable features as working effectively only at highly elevated temperatures, requiring unsaturated polymers, or being adversely affected by air and moisture. The prior art is limited to teaching the preparation of chloronitrosylated polymers by incorporating the chloronitroso groups in the polymer itself. U.S. Pat. No. 3,723,404 teaches the preparation of chloronitrosylated polymers by reacting the polymer with nitrosyl chloride or chlorine and nitric oxide in the presence of a free radical catalyst and in the presence of a solvent. The resulting chloronitrosylated polymer may then be crosslinked by treatment with heat either in the presence or absence of any fillers.

U.S. pat. No. 3,763,134 teaches the preparation of chloronitrosylated polymers by reacting the polymer with nitrosyl chloride or chlorine and nitric oxide in a two-phase system employing fluorocarbons as the reaction medium.

SUMMARY OF THE INVENTION

Various polymers may be crosslinked by the use of polyfunctional chloronitroso compounds. These compounds are prepared by treatment of the corresponding polyfunctional oxime with a positive chlorine containing environment such as t-butyl hypochlorite or chlorine in aqueous hydrochloric acid solution. The first procedure has been described by Diekmann and Lüttke, Angew. Chem. 80, 395, (1968) in which the dioxime of 1,4-cyclohexanedione is reacted with t-butyl hypochlorite in trichloromethane. Treatment of the dioxime of 1,4-cyclohexanedione with concentrated HCl followed by reaction with chlorine gas has been described by Piloty and Steinbock, Chem. Ber. 35, 3101 (1902).

The types of polymers to which this invention may be applied include hydrocarbon polymers which may be saturated, unsaturated, linear or branched, crystalline, or non-linear amorphous polymers, homopolymers, copolymers, terpolymers as for example polyethylene, polypropylene, polystyrene, styrene-butadiene rubber, butyl rubber, natural rubber, polybutadiene, polyisobutylene, ethylenepropylene copolymers, 1,4-polyisoprene, ethylene-propylenedichloropentadiene terpolymer, and blends of these polymers with each other or non-hydrocarbon polymers can be modified with the chloronitroso containing compound. In addition to the hydrocarbon polymers, non-hydrocarbon polymers including copolymers, terpolymers, and so forth, can also be modified with the chloronitroso derivatives. Typical of these non-hydrocarbon polymers are the vinyl chloride polymers containing at least 10 mol percent of vinyl chloride such as polyvinyl chloride, vinyl chloride-vinyl acetate copolymers, vinyl chloride-vinylidene chloride copolymers, perfluoropropylene-vinylidene fluoride, chlorinated natural rubber, sulfo-chlorinated polyethylene, and chlorinated polymers such as chloroprene, chlorinated butyl rubber, polyethylene, polypropylene and copolymers thereof.

DESCRIPTION OF THE PREFERRED EMBODIMENT

The polyfunctional chloronitroso compounds which can be used as crosslinking agents in accordance with this invention have the following general formula

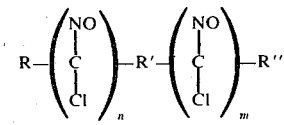

where R, R′, R″ are organic radicals selected from the group consisting of hydrogen, methyl, ethyl, propyl, linear or cyclic butyl, pentyl, hexyl, heptyl, octyl, nonyl, decyl, undecyl, dodecyl and tridecyl, $n$ is an integer from 1 to 10, and $m$ is an integer from 0 to 10.

The crosslinking is carried out by contacting the polymer and a minor amount of the polyfunctional chloronitroso crosslinking agent for a time sufficient to obtain the desired degree of crosslinking. The amount of polyfunctional chloronitroso compound added will depend on the amount of crosslinking desired. While from 0.01 percent to about 50 percent by weight of the polymer of polyfunctional chloronitroso compounds can be employed it is preferred to use between 0.1 percent and about 10 percent by weight of the polymer.

The chloronitroso derivatives may be incorporated in the polymer in any desired fashion. For example it can be uniformly blended by simply milling on a conventional rubber mill or dissolving in a solution containing the polymer. By either means it is distributed throughout the polymer and uniform crosslinking or other modification is effected when the blend is either subjected to heat or irradation. Other means of mixing the chloronitroso compounds with the polymer will be apparent to those skilled in the art.

In addition to the chloronitroso containing compound other additives can also be incorporated. The additives commonly used in rubber vulcanites can be used here also as for examples extenders, fillers, pigments, plasticizers, stabilizers, and so forth. Obviously there are many cases in which a filler is not required or desired and excellent results are achieved when only the chloronitroso containing compounds are added.

The crosslinked polymers of this invention are hard, tough plastics which are substantially insoluble in various hydrocarbon solvents and chlorinated solvents such as chloroform, carbon tetrachloride, and methylene chloride. These polymers exhibit improved tensile properties over their uncured counterparts. The cured polymers range from rubbery materials to hard plastics with a wide variety of uses, e.g., machine parts and potting compositions. They are useful in various applications such as for example as protective and decorative coatings for various substrates including wood, metals, paper and plastics, as ingredients of tires for motor vehicles, tubing, pipes and other rubber articles and the like.

The process of the present invention permits the crosslinking of a wide variety of high molecular weight saturated polymers prepared by the polymerization of monomers containing at least 1 carbon to carbon double bond. The polymers which are crosslinked by the process may be formed into sheets or films or fibers after incorporation of the chloronitroso containing crosslinking agent before effecting a cure by heating. These shaped forms may be prepared by extruding the compounded stock through suitable dies. They may also be prepared by dissolving the compounded stock in a volatile solvent and laying down a layer of the solution and allowing the solvent to evaporate or extruding a concentrated solution through a spinneret and the solution evaporated. The resulting films or fibers are then subjected to heat to crosslink or to cure. The compounded stock may be formed into thin sheets on roller mills and the sheets taken off as unsupported films. If desired the films may be calendered onto substrates and the composite heated to vulcanize or crosslink the polymers.

The polymers which are crosslinked according to the present invention may be used generally in a fashion similar to polymers which have been crosslinked by known conventional curing procedures. However, the crosslinking process of the present invention yields polymers which tend to be more solvent resistant. The vulcanized polymers may be used for injection molding, electrical insulation, supported and unsupported films and fibers, wrapping materials, and so forth. The polymers may be varied by the addition of compounding ingredients at the time the chloronitroso containing crosslinking agents are incorporated in the polymer. Suitable compounding ingredients are carbon black, pigments, stearic acid, and so forth.

Mixing of the crosslinking agent with liquid polymers can be accomplished in dough mixers, high speed impeller mixers, paddle-type mixers and the like. For best results it is often preferred that further mixing be effected by the use of a three-roll mill such as is used in paint and ink manufacture. When a solid polymer is to be cured, the crosslinking agent may be dispersed on a rubber mill or in an internal mixer such as a Banbury mixer.

In mixing the chloronitroso compound with either fluid polymers or millable gums the temperature must be kept below the decomposition point of the crosslinking agent to prevent premature curing. The decomposition points of the chloronitroso compounds are a function of the particular compound employed and the polymer in which the compound is dispersed. The temperature utilized during the curing of the polymer is from about 30° to about 300°C. While the temperature is not particularly critical it must be above the temperature at which the chloronitroso compound decomposes in the system being cured. This temperature will of course vary with each particular chloronitroso compound.

Full curing of the polymers ordinarily take from about one minute to about 24 hours, depending upon the temperatures employed. Preferred curing times range from 0.5 hour to 12 hours at temperatures ranging from about 100° to about 150°C. At these preferred curing temperatures sufficient cure to permit demolding occurs within from about 5 seconds to 5 minutes. This is due to the fast reactivity of the chloronitroso compounds once decomposition occurs. The present invention provides unlimited time for mixing, prolonged storage of the mixture and for filling the most complex molds. The curing equipment and curing procedures used in the present invention are conventional.

The following examples are illustrative of the present invention and therefore are not intended in any way as a limitation on the scope thereof. Parts and percents are by weight unless otherwise indicated. These examples illustrate both the methods of preparation of chloronitroso containing compounds and the cured polymers obtained when these compounds are employed for crosslinking purposes.

EXAMPLE 1

Fifty grams of 1,4-cyclohexanedioxime was slurried in 500 gms of concentrated hydrochloric acid and the mixture then cooled to 3°C. Fifty-five grams of chlorine gas was then bubbled through the slurry. The resulting product was extracted using trichlorofluoromethane. Removal of the trichlorofluoromethane and recrystallization from boiling methanol yielded the product, 1,4-dichloro-1, 4-dinitrosocyclohexane.

EXAMPLE 2

Ten grams of 1,4-cyclohexanedioxime was slurried in a mixture of 50 mls of trichlorofluoromethane and 50 mls of chloroform and the slurry was cooled to −5°C. T-butylhypochlorite (15.1 gms) in 50 mls of trichlorofluoromethane was slowly added to the slurry while maintaining the temperature at −5°C. Upon completion of the addition, the mixture was maintained at room temperature for 20 hours. Removal of the solvents and recrystallization from chloroform yielded the product 1,4-dichloro-1,4-dinitrosocyclohexane. This product is similar to that obtained in Example 1.

EXAMPLE 3

Three grams of 2,2,4,4-tetramethyl-1,3-cyclobutanedioxime was added to 2.8 grams of chlorine dissolved in 100 ml trichlorofluoromethane. The mixture was maintained at 25°C., with stirring, for 4.5 hours, then kept at 0°C, for 48 hours. The product, 2,2,4,4-tetramethyl-1, 3-dichloro, 1,3-dinitrosocyclobutane, was obtained upon filtration, removal of trichlorofluoromethane and recrystallization from methanol.

EXAMPLE 4

2,4-pentanedioxime (13.1 gms) was slurried in 300 mls of 1,1,2,3-tetrafluoro-1,2-dichloroethane and 23.8 gms of t-butylhypochlorite was slowly added to the mixture. Upon filtration and recrystallization from methanol the product, 2,4-dichloro-2,4-dinitrosopentane was obtained.

EXAMPLE 5

Eight grams of 7-tridecane oxime in 50 mls of trichlorofluoromethane was reacted with 5.06 gms of t-butylhypochlorite at −40°C. Upon completion of the reaction, removal of the solvent and recrystallization from chloroform, the product 7-chloro-7-nitrosotridecane was obtained.

The following ASTM methods were employed for determining the physical properties of the cured polymers prepared in the subsequent Examples.

| | |
|---|---|
| Modulus at 100% Elongation | D412 |
| Modulus at 200% Elongation | D412 |
| Modulus at 300% Elongation | D412 |
| Modulus at 500% Elongation | D412 |
| Tensile at break | D412 |
| Elongation at break | D412 |

-continued

| Yield Point | D412 |
|---|---|

EXAMPLE 6

Three samples of a chlorinated polyethylene resin having the following typical property values:

| | |
|---|---|
| Melt viscosity, poises/1000 | 24 |
| Bulk density, lbs./cu.ft. | 28 |
| Chlorine content, % | 36 |
| Residual crystallinity, % | 0–2 |
| Typical screen analysis: | |
| % retained on 12 mesh | 5 |
| % through 40 mesh | 5 |
| Volatiles, % maximum | 0.2 | was compounded according to the following recipe:

| | |
|---|---|
| 100 | parts chlorinated polyethylene resin |
| 10 | parts magnesium oxide |
| 1 | part stearic acid |
| 40 | parts carbon black |
| 3.5 | parts 2,2,4,4-tetramethyl-1,3-dichloro-1,3-dinitroso-cyclobutane prepared in Example 3. |

Each formulation was compounded on a two roll mill by conventional rubber procedure and then cured in a preheated metal mold at a temperature of 150°C. for ½, 1, and 2 hours. The resulting vulcanizates were odorless. The properties of the vulcanizates were determined and set forth in Table I. The resulting products were hard, tough rubbers, having no yield point, which were completely gelled and were substantially insoluble in boiling carbon tetrachloride and chlorobenzene.

TABLE I

| Run | Mold Time, hours | Tensile Strength psi | 500% Modulus psi | 300% Modulus psi | 100% Modulus psi | % Elongation |
|---|---|---|---|---|---|---|
| 1 | ½ | 2153 | 1977 | 1070 | 441 | 603 |
| 2 | 1 | 2703 | 2566 | 1416 | 724 | 580 |
| 3 | 2 | 2166 | 2054 | 1140 | 453 | 574 |

EXAMPLE 7

In a control run, the above procedure as described in Example 6 was duplicated, except that no chloronitroso containing material was added to the chlorinated polyethylene resin. The properties of these formulated resin after subjection to heat were determined and set forth in Table II. The resulting products had little, if any, gel content and were readily soluble in boiling carbon tetrachloride and chlorobenzene.

TABLE II

| Run | Mold Time, hours | Tensile Strength psi | 500% Modulus psi | 300% Modulus psi | 100% Modulus psi | % Elongation | Yield Point |
|---|---|---|---|---|---|---|---|
| 4 | ½ | 1803 | 1146 | 627 | 393 | 771 | 338 |
| 5 | 1 | 1349 | 970 | 555 | 348 | 796 | 288 |

EXAMPLE 8

Three samples of a chlorinated polyethylene resin having the typical properties described in Example 6, were crosslinked with 2,4-dichloro-2,4-dinitrosopentane prepared according to the method described in Example 4. The formulations for these examples were as follows:

| | |
|---|---|
| 100 | parts chlorinated polyethylene resin |
| 10 | parts magnesium oxide |
| 1 | part stearic acid |
| 40 | parts carbon black |
| 2.93 | parts 2,4-dichloro-2,4-dinitrosopentane prepared in Example 4. |

The ingredients were compounded on a two roll mill at a temperature between 25°–35°C. for 15 minutes and then cured in a preheated mold at a temperature of 150°C. for varying times. The resulting vulcanizates were odorless and were completely gelled, being substantially insoluble in boiling carbon tetrachloride and chlorobenzene. Typical physical properties were determined and set forth in Table III. No yield point for these vulcanizates was observed.

TABLE III

| Run | Mold Time, hours | Tensile Strength psi | 500% Modulus psi | 300% Modulus psi | 100% Modulus psi | % Elongaton |
|---|---|---|---|---|---|---|
| 6 | ½ | 1774 | 1661 | 956 | 476 | 568 |
| 7 | 1 | 1833 | 1734 | 1021 | 478 | 587 |
| 8 | 2 | 1617 | 1597 | 1009 | 500 | 542 |

EXAMPLE 9

Two samples of a synthetic fluoroelastomer perfluoropropylene-vinylidene fluoride having the following typical properties values:

| | |
|---|---|
| Specific gravity | 1.86 |
| Mooney Viscosity, | |
| ML-4 at 212°F. | |
| (Typical sample) | |
| Original | 117 |
| After cold milling | |
| 10 minutes | 117 |
| 20 minutes | 118 |
| 30 minutes | 118 |
| Appearance | White, translucent |
| Odor | None |

-continued

Solubility                Low molecular weight, ketones were formulated according to the following recipe:

| | Run | |
|---|---|---|
| | 9 | 10 |
| Fluoroelastomer | 100 parts | 100 parts |
| Carbon black | 18 parts | 18 parts |
| Magnesium oxide | 15 parts | 15 parts |
| 2,4-dichloro-2,4-dinitrosopentane | 2.9 | — |

The ingredients were compounded on a two roll mill and then cured at 150°C. for 1 hour followed by 200°C. for 24 hours. Typical physical properties were determined and set forth in Table IV.

TABLE IV

| | Run | |
|---|---|---|
| | 9 | 10 |
| Tensile strength, psi | 1203 | 268 |
| 100% Modulus | 369 | — |
| % Elongaton | 320 | — |
| Boiling methylethyl ketone | Insoluble | Soluble |

The vulcanized elastomer, Run 9, had no elongation set. It is noted that Run 10 is a control run made in exactly the same manner, except that no chloronitroso containing crosslinking agent was added to the polymer and produced an elastomer which was completely soluble in methylethyl ketone.

EXAMPLE 10

Two samples of a chlorinated polyethylene resin having the typical properties described in Example 6 were crosslinked with 1,4-dichloro-1,4-dinitrosocyclohexane prepared according to the method described in Example 2. The formulation for this example was the same as noted in Example 8, except that 3.1 parts of 1,4-dichloro-1,4-dinitroso-cyclohexane was used in place of the bis(dichlorodinitroso) pentane crosslinking agent. The formulated stock was compounded on a two roll mill for about 15 minutes and the resulting mixtures were cured in a closed iron mold at temperatures of 150°C. for varying times. The resulting vulcanizates were odorless and insoluble in boiling carbon tetrachloride and chlorobenzene. The properties of the vulcanizates were as follows:

TABLE V

| Run | Mold Time, hours | Tensile Strength psi | 300% Modulus psi | 100% Modulus psi | % Elongation |
|---|---|---|---|---|---|
| 11 | ½ | 1771 | 1412 | 658 | 409 |
| 12 | 1 | 2353 | 1781 | 787 | 413 |

EXAMPLE 11

Two 80 part samples of an ethylene-propylene terpolymer rubber having the following reported properties:

| | | |
|---|---|---|
| Mooney Viscosity (ML) 1+8 minute reading at 260°F. | 57 min. | 67 max. |
| Vanadium, ppm | 100 | |
| Ash, wt. % | 0.3 | |
| Volatiles at 105°C. wt. % | 0.5 | |
| Stabilizer, nonstaining, wt. % | 0.10 min. | 0.25 max |
| Color | Light gray | |
| Specific gravity | 0.86 | | were formulated with 8 parts magnesium oxide, 0.8 part stearic acid and 2.5 parts 1,4-dichloro-1,4-dinitrosocyclohexane. The formulation was incorporated in the terpolymer as described in Example 10, and then the mixture was cured in a closed iron mold at 150°C. for ½ and 1 hour. The resulting vulcanizate was odorless and had the following properties:

TABLE VI

| Run | Mold Time, hours | Tensile Strength psi | 500% Modulus psi | 300% Modulus psi | 100% Modulus psi | % Elongation |
|---|---|---|---|---|---|---|
| 13 | ½ | 178 | 163 | 152 | 136 | 766 |
| 14 | 1 | 158 | 142 | 138 | 132 | 741 |

EXAMPLE 12

Four samples of a chlorinated polyethylene resin were crosslinked with 7-chloro-7-nitrosotridecane. The formulation of each sample was as follows:

| | Run | | | |
|---|---|---|---|---|
| | 15 | 16 | 17 | 18 |
| Chlorinated polyethylene | 100 | 100 | 100 | 100 |
| Magnesium oxide | 10 | 10 | 10 | 10 |
| Stearic acid | 1 | 1 | 1 | 1 |
| Carbon black | — | — | 40 | 40 |
| 7-chloro-7-nitrosotridecane | 7.6 | 7.6 | 7.6 | 7.6 |

Each formulation was compounded on a two roll mill by conventional rubber procedure and then cured in an iron mold at a temperature of 150°C. for various lengths of time. The resulting vulcanizates were all insoluble in boiling chlorobenzene. The properties of the vulcanizates were determined and are set forth in Table VII.

TABLE VII

| Run | Mold Time, hours | Tensile Strength psi | 500% Modulus psi | 300% Modulus psi | 100% Modulus psi | % Elongation |
|---|---|---|---|---|---|---|
| 15 | ½ | 1172 | 542 | 307 | 186 | 710 |
| 16 | 1 | 867 | 498 | 294 | 190 | 622 |
| 17 | ½ | 1802 | — | 850 | 386 | 537 |

TABLE VII-continued

| Run | Mold Time, hours | Tensile Strength psi | 500% Modulus psi | 300% Modulus psi | 100% Modulus psi | % Elongation |
| --- | --- | --- | --- | --- | --- | --- |
| 18 | 1 | 1951 | — | 1026 | 399 | 479 |

The embodiments of the invention in which an exclusive property or privilege is claimed are defined as follows:

1. A process for crosslinking a polymer which is selected from the group consisting of polyethylene, polypropylene, polystyrene, styrene-butadiene rubber, butyl rubber, natural rubber, polybutadiene, polyisobutylene, ethylenepropylene copolymers, 1,4-polyisoprene, ethylene-propylene dichloropentadiene terpolymer, polyvinyl chloride polymer, vinyl chloride-vinyl acetate copolymers, vinyl chloride-vinylidene chloride copolymers, chlorinated natural rubber, sulfochlorinated polyethylene, chloroprene, chlorinated butyl rubber, chlorinated polyethylene, chlorinated polypropylene, perfluoropropylene vinylidene fluoride and copolymers thereof which comprises reacting said polymer with a chloronitroso compound having the general formula

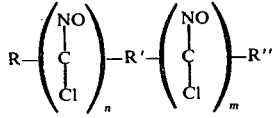

wherein R, R', R'' are selected from the group consisting of hydrogen, methyl, ethyl, propyl, linear or cyclic butyl, pentyl, hexyl, heptyl, octyl, nonyl, decyl, undecyl, dodecyl, and tridecyl, $n$ is an integer from 1 to 10, $m$ is an integer from 0 to 10 and the amount of said chloronitroso compound is from about 0.01 to about 50 weight percent of the polymer.

2. The process of claim 1 wherein said chloronitroso compound is 7-chloro-7-nitrosotridecane.

3. The process of claim 1 wherein said chloronitroso compound is 2,4-dichloro-2,4-dinitrosopentane.

4. The process of claim 1 wherein said chloronitroso compound is 2,2,4,4-tetramethyl-1,3-dichloro-1,3-dinitroso cyclobutane.

5. The process of claim 1 wherein said chloronitroso compound is 1,4-dichloro-1,4-dinitrosocyclohexane.

6. The process of claim 1 wherein said polymer is crosslinked with said chloronitroso compound at a temperature range of from about 30°C. to about 300°C.

* * * * *